UNITED STATES PATENT OFFICE.

EDWARD DUGDALE, OF GRIFFIN, GEORGIA.

IMPROVEMENT IN COFFEE SUBSTITUTES.

Specification forming part of Letters Patent No. 143,889, dated October 21, 1873; application filed October 13, 1873.

*To all whom it may concern:*

Be it known that I, EDWARD DUGDALE, of Griffin, in the county of Spalding and State of Georgia, have invented a new article of merchandise, of which a full, clear, and exact description is given in the following specification:

My invention relates to a new article of merchandise, of which the base is the seed of the persimmon, *Diospyros Virginiana*, which seed is treated in a manner hereinafter described, and also set forth in an application which is filed herewith in the United States Patent Office.

To prepare the seed it is first separated from the pulp or fruity matter to which it is attached, then cleaned and subjected to the action of heat, and thus reduced to a partially-carbonized mass, which, although it may differ chemically from roasted coffee, has its appearance and taste to a great extent.

My invention consists in the seed of the persimmon, *Diospyros Virginiana*, treated in the manner above described, adapted to be used as a mixture with coffee, or a substitute therefor.

I claim as my invention—

As a new article of merchandise, the partially-carbonized persimmon (*Diospyros Virginiana*) seed, either reduced to minute particles or entire, as and for the purposes set forth.

EDWD. DUGDALE.

Witnesses:
   JNO. M. HUFF,
   GEO. W. HUMPHRIES.